L. HOLLAND-LETZ.
GRAIN LIFTER FOR HARVESTERS.
APPLICATION FILED OCT. 27, 1913.
1,204,441.
Patented Nov. 14, 1916.
2 SHEETS—SHEET 1.
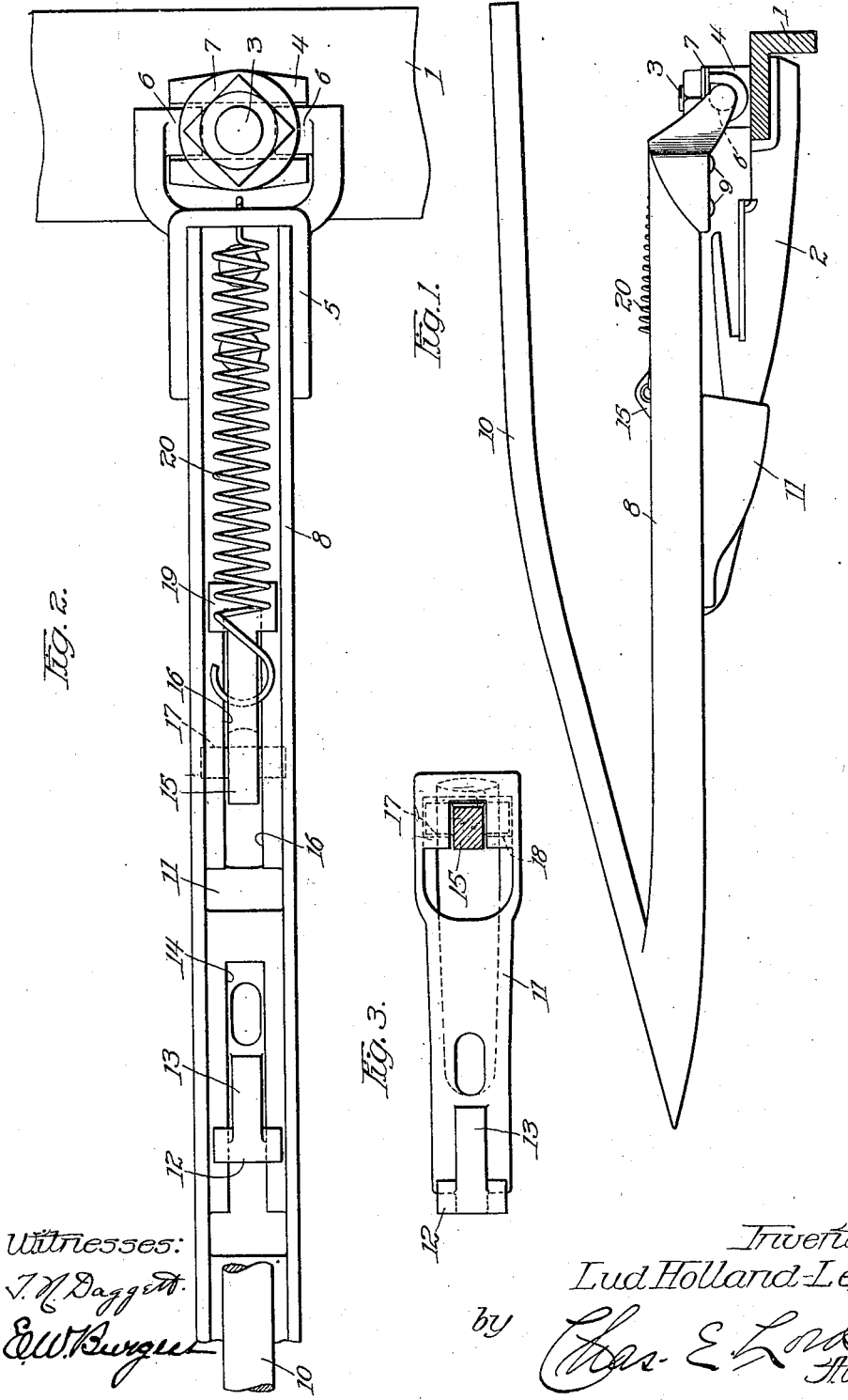

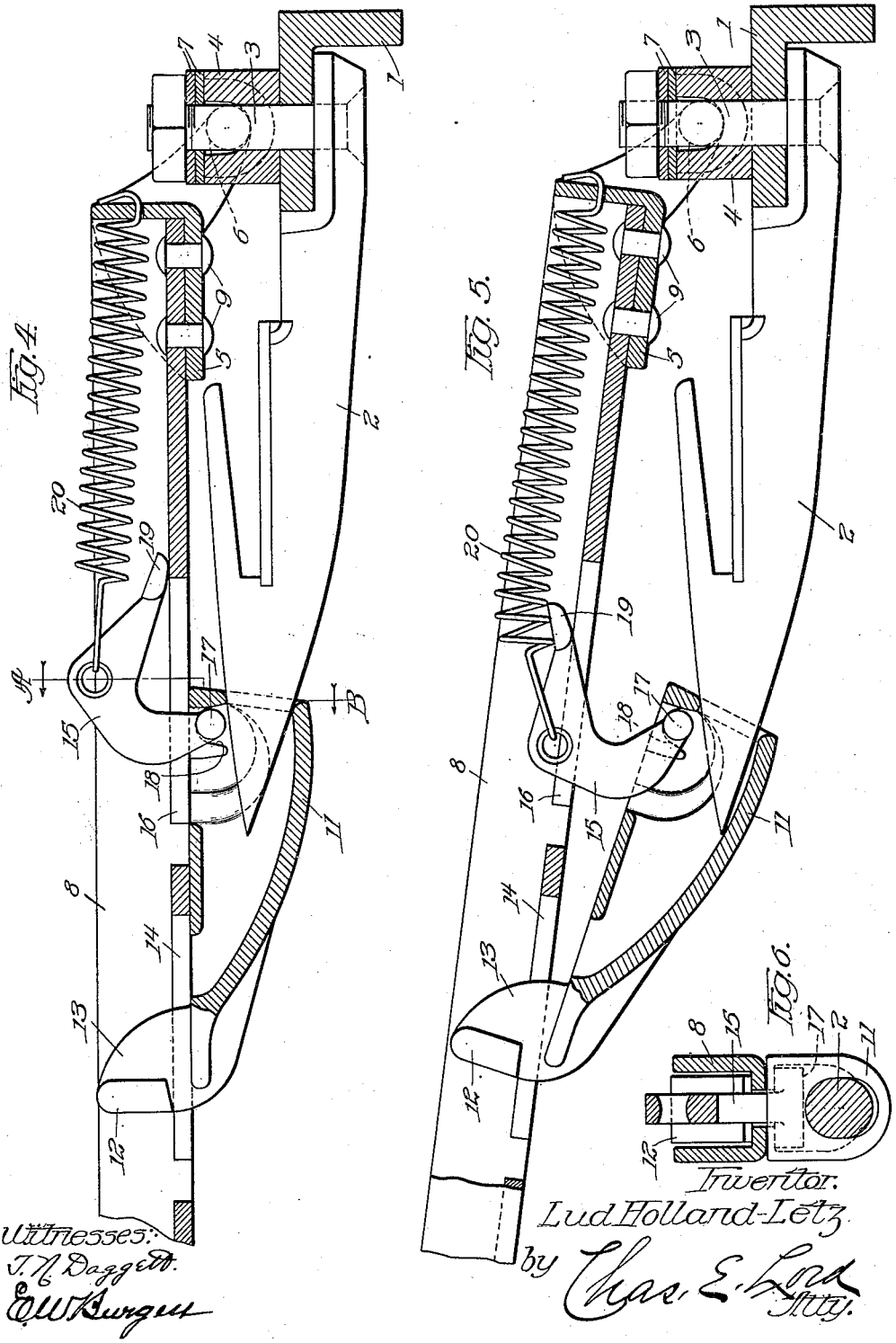

UNITED STATES PATENT OFFICE.

LUD HOLLAND-LETZ, OF OAK PARK, ILLINOIS, ASSIGNOR TO INTERNATIONAL HARVESTER COMPANY OF NEW JERSEY, A CORPORATION OF NEW JERSEY.

GRAIN-LIFTER FOR HARVESTERS.

1,204,441.          Specification of Letters Patent.     Patented Nov. 14, 1916.

Application filed October 27, 1913. Serial No. 797,437.

*To all whom it may concern:*

Be it known that I, LUD HOLLAND-LETZ, a citizen of the United States, residing at Oak Park, in the county of Cook and State of Illinois, have invented certain new and useful Improvements in Grain-Lifters for Harvesters, of which the following is a full, clear, and exact specification.

My invention relates to grain lifters for harvesters, mowers or the like.

It has among its objects to provide an improved form of grain lifter which may be readily attached to or detached from the guards upon a finger bar, which is free to rise and fall at its front end to a limited extent in passing over uneven ground, and is adapted to be attached to cutting apparatus having varying dimensions and forms.

A further object of my invention is to provide an improved grain lifter of simple, rugged and efficient construction which may be practically universal in its application and which may be manufactured at small expense.

Other objects and advantages of my improved construction will hereinafter appear.

I attain these objects by means of an improved construction of grain lifter adapted to be operatively connected to a finger bar in an improved manner, as hereinafter more fully set forth.

In the accompanying drawings I have illustrated one embodiment which my invention may assume in practice.

In these drawings: Figure 1 is a side elevation of a complete grain lifter attached to the finger bar of a harvester and having my invention embodied in its construction;
Fig. 2 is a top plan view of part of Fig. 1 on an enlarged scale; Fig. 3 is a detached detail view of a part of Fig. 2; Fig. 4 is a sectional side elevation of the device when in the normal operative position; Fig. 5 is a view similar to Fig. 4, showing the lifter raised at its front end to pass an obstruction; and Fig. 6 is a cross section of Fig. 4 along line A—B.

The same reference characters designate like parts throughout the several views.

1 represents the finger bar of a harvester or other machine, 2 is a guard finger secured thereto by means of a bolt 3, 4 a longitudinally grooved trunnion-receiving member that is secured to the upper side of the finger bar by means of the same bolt, and 5 represents a bracket member having a box-like form and provided with inwardly turned trunnions 6 at its rear end that are received by the saddle member 4 in a manner to permit the bracket member to swing in a vertical plane, the bracket being secured to the saddle by means of washers 7 upon the bolt 3.

8 represents a bar, preferably of channel shape and forming the body of the lifter, and having its rear end secured to the front end of the bracket 5 by means of rivets 9.

10 represents a rod secured to the front end of the bar and disposed upwardly and rearwardly and operating as a lifter for fallen grain, the rod being of such dimensions as will permit it to yield under heavy duty.

11 represents a guard-engaging or holding member of tubular form having its rear end partially inclosed and adapted to receive the point of the guard, its front end being provided with a cross head 12 and a rearwardly extending centrally disposed rib 13 that is received by a longitudinally disposed slot 14 in the body of the bar 8, whereby the holding member may move along the bar to accommodate itself to various lengths of guards, the slot at its front end being widened to permit the cross head to pass through. As shown, the cross head 12 secures the member 11 in operative position when it is moved along the slot, and the rib 13 is wide enough to prevent the holding member from swinging laterally.

15 represents a curved swinging and bodily movable lifter controlling bell crank lever having a narrow body portion that is slidably received by a slot 16 disposed longitudinally in the bar 8 and provided at one end with laterally disposed trunnion members 17 that are received by trunnion receiving members 18 formed upon the rear end of the holding member 11, said lever at its opposite end being provided with a cross head 19 that contacts with the side walls of the slot 16. As shown, this slot is widened at its front end to permit the passage of either end of the lever.

20 represents a tension spring having one end connected with the lever 15 intermediate the end of the latter, and its opposite end with the bracket member 5, the spring being operative to normally hold the bar 8 in its lower relative position, as shown in Fig. 4. Obviously when the bar meets an obstruction it will rise against the tension of the spring, as shown in Fig. 5, until the cross head 19, which then engages the spring 20 moves along the slot 16 and toward the front end thereof into a neutral position, as shown in Fig. 5, and when the bar 8 has cleared the obstruction the spring 20 automatically returns it to its normal operative position.

The lifter mechanism, as illustrated and described, automatically adjusts itself through a wide range to meet the requirements of various machines having different dimensions in the cutting apparatus.

While I have in this application described one form which my invention may assume in practice, it is to be understood, however, that the embodiment shown herein for purposes of illustration may be modified without departing from the spirit of my invention as disclosed in the appended claims.

What I claim as my invention, and desire to secure by Letters Patent, is:

1. In a grain lifter, a slotted supporting bar, and a guard-engaging member movable in said slot and having a shoulder resting on one of the edges thereof.

2. In a grain lifter, a slotted supporting bar, and a guard-engaging member movable in said slot and having oppositely disposed shoulders resting on the opposite edges thereof.

3. In a grain lifter, a supporting member having a slot therein provided with an enlarged opening communicating therewith, and a guard-engaging member carried in said slot having a projection thereon removable bodily through said enlarged opening.

4. In a grain lifter, a supporting member having a slot therein provided with an enlarged opening communicating therewith, and a guard-engaging member carried in said slot having a cross head thereon removable bodily through said enlarged opening.

5. In a grain lifter, a supporting member having a slot therein provided with an enlarged opening communicating therewith, and a guard-engaging member carried in said slot and having a cross head thereon removable bodily through said enlarged opening, said member being movable in a vertical plane in said slot.

6. In a grain lifter, a slotted supporting bar, a guard-engaging member pivotally mounted thereon, a lever operatively connected to said guard-engaging member and extending through the slot in said supporting member, and resilient means controlling the movement of said lever.

7. In a grain lifter, a slotted supporting bar, a guard-engaging member pivotally mounted thereon, a bell crank lever disposed in the slot in said supporting member and pivotally connected to said guard-engaging member having an enlarged portion engageable with the edge of said slot, and resilient means operatively connected to said lever.

8. In a grain lifter, a slotted supporting member, a guard engaging member pivotally mounted thereon, a bell crank lever extending through the slot in said supporting member having one end engageable with one surface of said supporting member and the other pivotally connected with said guard engaging member, and a spring connected between said bell crank lever and said supporting member.

9. In a grain lifter, a slotted supporting member, a guard-engaging member pivotally mounted thereon, a bell crank lever extending through the slot in said supporting member and pivotally connected to said guard-engaging member, a spring connected between said bell crank lever and said supporting member, and means on said bell crank lever engageable with said spring at a point intermediate the ends of the latter.

10. In a grain lifter, a supporting member having a slot therein and an enlarged opening communicating therewith, a guard-engaging member pivotally mounted on said supporting member, and a bell crank lever pivotally connected to said guard engaging member and extending through the slot in said supporting member, said lever having an enlarged head removable through said enlarged opening.

11. In a grain lifter, a supporting member having a slot therein and an enlarged opening communicating therewith, a guard-engaging member pivotally mounted on said supporting member, a bell crank lever having an enlarged portion pivotally connected to said guard-engaging member, said lever extending through the slot in said supporting member and having its enlarged portion removable through said enlarged opening, and a spring operatively connected to said lever.

12. In a grain lifter, a slotted supporting member having enlarged openings therein communicating with its slotted portions, a guard-engaging member pivoted in one of said slots, a bell crank lever operatively connected to said guard-engaging member and disposed in the other slot, both said guard-engaging member and said bell crank lever having enlarged portions retaining them in said slots and bodily removable through said enlarged openings upon reciprocation of said members in their slots, and spring mechanism normally holding said guard-engaging member against the slotted surface of said supporting member.

13. In a grain lifter, a bar having one end provided with means whereby it may be pivotally connected with the finger bar of a harvester in a manner permitting its opposite end to swing in a vertical plane in the direction of the line of draft of the machine, the body of said bar being provided with longitudinally disposed slots, a vertical swinging member having one end slidably and pivotally carried by said slotted bar and its opposite end adapted to receive the point of a harvester guard, and a spring controlled bodily movable bell crank lever engaging with said bar and said swinging guard receiving member in a manner to yieldingly retain them in an operative position.

14. In a grain lifter, a bar having one end provided with means whereby it may be pivotally connected with the finger bar of a harvester in a manner permitting its opposite end to swing in a vertical plane in the direction of the line of draft of the machine, the body of said bar being provided with longitudinally disposed slots, a vertical swinging member having one end slidably and pivotally carried by said slotted bar and its opposite end adapted to receive the point of a harvester guard, and a spring controlled bell crank lever movable bodily in a longitudinal direction upon said bar and permitted to swing vertically relative thereto, one arm of said lever being pivotally connected with said swinging guard receiving member.

15. In a grain lifter, a bar having one end provided with means whereby it may be pivotally connected with the finger bar of a harvester in a manner permitting its opposite end to swing in a vertical plane in the direction of the line of draft of the machine, the body of said bar being provided with longitudinally disposed slots, a vertical swinging member having one end slidably and pivotally carried by said slotted bar and its opposite end adapted to receive the point of a harvester guard, and a spring controlled longitudinally movable bell crank lever carried by said slotted bar having one arm engaging with said bar and its remaining arm pivotally connected with said guard receiving member and movable in a vertical plane.

16. A grain lifter including a supporting bar having longitudinally disposed slots therein, means whereby said bar may be pivotally connected with a cutting apparatus in a manner permitting it to swing in a vertical plane, a holding member having one end received by one of the slots in said supporting bar in a manner permitting it to swing in a vertical plane and to move longitudinally along said bar, the opposite end of said holding member being adapted to receive the point of a guard, a curved lever having one end pivotally connected with said holding member and its opposite end slidably received by one of the slots in said supporting bars and provided with a cross head member to retain it therein, a tension spring having one of its ends connected with said supporting bar whereby the holding member automatically adjusts itself to guards having varying dimensions, and a supporting bar yieldingly held in a normal operative position.

In testimony whereof I affix my signature, in the presence of two witnesses.

LUD HOLLAND-LETZ.

Witnesses:
  C. G. GRZEGORZEWSKI,
  ANTON G. NETZ.

Copies of this patent may be obtained for five cents each, by addressing the "Commissioner of Patents, Washington, D C."